United States Patent [19]

Arya et al.

[11] 4,229,654
[45] Oct. 21, 1980

[54] DETERMINING FISSILE CONTENT OF NUCLEAR FUEL ELEMENTS

[75] Inventors: Satya P. Arya, Wilmington; Leonard N. Grossman, Wrightsville Beach; Frederick C. Schoenig, Jr., Wilmington, all of N.C.

[73] Assignee: General Electric Company, San Jose, Calif.

[21] Appl. No.: 931,669

[22] Filed: Aug. 7, 1978

[51] Int. Cl.$^2$ .................... G01N 23/00; G01T 1/20; G21C 17/00
[52] U.S. Cl. .................... 250/358 R; 250/362; 250/390; 176/19 R
[58] Field of Search ............... 250/395, 362, 369, 390, 250/391, 392, 358 R; 176/19 R

[56] References Cited

U.S. PATENT DOCUMENTS

| | | | |
|---|---|---|---|
| 2,717,693 | 9/1955 | Holmes | 250/303 |
| 3,018,374 | 1/1962 | Pritchett | 250/362 |
| 3,389,254 | 6/1968 | Russell | 250/362 |
| 3,755,675 | 8/1973 | Stepan et al. | 176/19 R |

FOREIGN PATENT DOCUMENTS 1923983 11/1969 Fed. Rep. of Germany.

OTHER PUBLICATIONS

G. Morrison et al., "Determination of U-235 by Gamma Scintillation Spectrometry", Anal. Chem., vol. 29 (12), 12-57, pp. 1770-1771.

Jackson, "Enrichment Tester for 0.15 to 3.0 Weight Percent U-235 Uranium Fuel", Materials Evaluation, 8-66, pp. 431-435.

Primary Examiner—Alfred E. Smith
Assistant Examiner—Carolyn E. Fields
Attorney, Agent, or Firm—Ivor J. James, Jr.; Samuel E. Turner; Sam E. Laub

[57] ABSTRACT

The amount of fissile material such as U-235 in each portion of a fuel element, some of which portions may also contain burnable poison such as gadolinium, is determined by detecting the gamma ray emission due to the natural radioactive decay of the fuel material, analyzing the gamma ray signals from each portion to provide a first count of gamma rays primarily due to the U-235 and a second count of gamma rays primarily due to the U-238 daughter products. These first and second counts are corrected for the cladding wall thickness, the density of the fuel material and the burnable poison content in each portion. The first (U-235) count is then corrected by the second (U-238 daughter) count and the thus corrected U-235 count is converted to an indication of the fuel enrichment in each portion. From the enrichment, the burnable poison content, the density of the fuel material and the volumes of each portion, the weight of U-235 in each portion can be determined.

14 Claims, 3 Drawing Figures

| Zone | Length of Zone (inches) | Measured Density (% Theoretical) | Measured Wall Thickness (inches × $10^{-3}$) | Measured Gadolinium (wt %) | Enrichment (wt %) | Measured U-235 (Grams) |
|---|---|---|---|---|---|---|
| 1 | 6.12 | 95.426 | 32.19 | 0.000 | 0.713 | 0.83 |
| 2 | 6.12 | 95.676 | 32.19 | 0.016 | 2.209 | 2.65 |
| 3 | 12.15 | 95.609 | 32.19 | 4.063 | 1.707 | 3.80 |
| 4 | 35.93 | 95.410 | 32.19 | 0.215 | 2.219 | 15.86 |
| 5 | 72.06 | 95.913 | 32.19 | 3.760 | 1.705 | 23.22 |
| 6 | 12.46 | 95.361 | 32.19 | 0.004 | 2.246 | 5.51 |
| 7 | 4.98 | 95.601 | 32.19 | 0.011 | 0.758 | 0.80 |

DETERMINING FISSILE CONTENT OF NUCLEAR FUEL ELEMENTS

BACKGROUND

This invention relates to the determination of the fissile fuel content of fuel for nuclear reactors. Such nuclear reactors are discussed for example in "Nuclear Power Engineering", M. M. El-Wakil, McGraw-Hill Book Company, Inc., 1962.

Nuclear reactors are typically refueled periodically with an excess of fuel sufficient to maintain operation throughout an operating cycle.

This excess of fuel results in an excess of reactivity which requires a control system of sufficient strength to maintain the effective multiplication factor at unity during reactor operation. The control system customarily comprises neutron absorbing or poison materials that serve to control the neutron population by nonfission absorption or capture of neutrons. Typically, the control system includes mechanical control in the form of a plurality of selectively actuatable poison containing control rods or the like which can be inserted into and withdrawn from the core as required.

Nuclear fuels include uranium and/or plutonium in suitable form. For example, in commonly used fuel for water cooled and moderated nuclear power reactors the fuel comprises uranium dioxide ($UO_2$) in which from about 0.7 to 5.0 percent is fissile U-235 mixed with fertile U-238. Such nuclear fuel typically is in the form of sintered pellets contained in an elongated cladding tube to form a fuel element or rod as shown, for example, in U.S. Pat. No. 3,378,458. Such fuel elements are arranged in groups and supported in separately replaceable fuel assemblies in the core of the reactor. A typical fuel assembly is shown for example in U.S. Pat. No. 3,689,358.

To decrease local power peaking and to achieve desired power distribution, it is known to vary the fuel enrichment radially from element-to-element within the fuel assembly and axially along the lengths of the elements. That is, the fissile fuel content of a fuel element may be varied from zone-to-zone along its length.

It is also known to include in the fuel core a burnable poison such as gadolinium which is a strong neutron absorber but is converted by neutron absorption to an isotope of low control worth (neutron absorbing capacity). Such use of burnable poisons decreases the amount of mechanical control required and, by appropriate arrangement of the burnable poison, improvements in power distribution can be achieved.

Such burnable poisons frequently are incorporated in the fuel elements in a mixture with selected portions of the nuclear fuel. As in the case of fissile fuel content, the burnable poison content of a fuel element may be varied from zone-to-zone along its length. A zoned arrangement of burnable poison is shown, for example, in U.S. Pat. No. 3,799,839.

It is desirable for quality control and identification purposes during nuclear fuel handling and fuel element and fuel assembly manufacturing processes to provide rapid nondestructive methods for determining accurately the amount, enrichment and location of the fissile fuel along the length of a fuel element.

An early method for the nondestructive determination of the relative fissile concentration or enrichment of fuel material can be called "passive scanning". Such a method is based upon the quantitative detection of gamma rays of characteristic energy emitted during the natural radioactive decay of a fissile material such as U-235. Such a method is discussed by G. H. Morrison et al in an article entitled "Determination of Uranium-235 by Gamma Scintillation Spectrometry", in Analytical Chemistry, Vol. 29, No. 12, December 1957, pages 1770 and 1771.

Further development of this passive scanning method for enrichment measurement involved a correction of the U-235 indication based upon the detection of gamma rays emitted by daughter products of U-238. The method and systems employing such correction are discussed, for example, by C. N. Jackson, Jr., in an article entitled "Enrichment Tester for 0.15 to 3.0 Weight Per Cent U-235 Uranium Fuel" in Materials Evaluation, August 1966, pages 431–435, and by J. T. Russell in U.S. Pat. No. 3,389,254.

Since U-235 has a relatively long half-life its spontaneous disintegration rate and consequent gamma ray emission is low. Because of this and because of the statistical nature of the gamma ray emission, the scanning times required for accurate U-235 determination by the passive scanning method are undesirably long for production fuel use, particularly for low enrichment fuel material. For example, it was found that fuel elements in the order of 4.5 meters long containing fuel of 2 to 3 percent enrichment required a scanning time in the order of forty minutes where a single gamma ray detector was used to obtain suitable accuracy in enrichment measurement.

The throughput can be increased (that is, the scanning time for fuel elements can be reduced) by the use of a plurality of gamma ray detectors serially arranged adjacent to the fuel element being scanned. The gamma ray counts from the detectors attributable to each local segment of the fuel element are accumulated and summed, thus decreasing the scanning time required for a given accuracy in proportion to the square root of the number of detectors employed. An arrangement of a plurality of radiation detectors for sorting radiation emissive material is shown by F. T. Holmes in U.S. Pat. No. 2,717,693.

A method for the simultaneous nondestructive determination of the enrichment and fissile content of fuel material can be called "active scanning". In this method the fuel element is moved past a narrow beam of neutrons of selected energy and the gamma radiation from successive local portions of the element resulting from the neutron-induced fission of the fissile material, such as U-235, is detected. The radiation count from each local portion is a function of the intensity of the neutron activation beam and the concentration of U-235 in the local portion. Active fissile content analyzer systems have been described, for example, in German patent publication No. 1,923,983 (published Nov. 20, 1969) and by R. A. Pritchett in U.S. Pat. No. 3,018,374.

Active scanning systems have been placed in use in commercial nuclear fuel manufacturing facilities because of the accuracy of fissile content and enrichment determinations and the favorable scanning speed afforded thereby. However, in the case of fuel elements containing a burnable poison mixed with the fuel material, the neutron activation or active scanning method is not found effective. Such fuel elements may contain burnable poison, such as gadolinium, in amounts in the order of 1–10 weight percent. Such amounts of gadolinium render the fuel pellet or body substantially black to neutrons. That is, the activation neutrons are absorbed by the burnable poison at the surface of the body and do not penetrate sufficiently to provide adequate activation of the fissile material. Furthermore, the variability of the burnable poison concentration along the length of the fuel rod tends to mask the measurement of the fissile fuel content.

Present quality control techniques for the determination of enrichment and fissile content of gadolinium bearing fuel involve destructive measurement of presumably representative samples and are undesirable because they are not a direct measurement and they are expensive and labor intensive.

Thus there remains a need for nondestructive methods and means for determining rapidly, accurately and simultaneously the fissile content, enrichment and location of fuel material which may also contain amounts of burnable poison.

It is an object of the invention to provide a nondestructive method and apparatus for determining rapidly and accurately the fissile fuel content of a fuel element which also contains burnable poison. Another object is a passive scanning method wherein the fissile material content indication is corrected for fuel material density, thickness of the fuel cladding and burnable poison content in order to obtain greater accuracy.

Another object is the simultaneous determination of fissile content and enrichment of fuel material.

Another object is the simultaneous or separate determination of fissile content enrichment by location within a nuclear fuel element.

SUMMARY

In accordance with the method and apparatus of the invention, a fuel element is scanned by moving it past one or more detectors responsive to the gamma rays emitted from the fuel material due to natural radioactive decay. Pulses from the detectors, which have magnitudes proportional to the energy of the gamma rays, are applied to pulse height analyzers and separated into two channels according to predetermined energy ranges. The pulses in each channel are counted and the counts stored in correspondence with sequential zones along the length of the fuel element. One channel contains the count of gamma ray primarily attributable to the fissile material (e.g., U-235) while the other channel contains the count of the gamma rays (of different energy) primarily attributable to the daughter products of U-238.

Means are provided for determining the burnable poison (e.g., gadolinium) content, the fuel material density and the cladding thickness at each zone and the fissile material and daughter product counts are corrected accordingly.

The fissile material (U-235) counts are then further corrected to remove the influence of the corrected U-238 daughter product count and from the thus corrected U-235 count the weight percent of U-235 in each zone is determined.

From the weight percent of U-235, the weight percent of gadolinium and the density of the fuel material in the zones and from the volumes of the zones, the weight of U-235 in each of the zones can be determined.

DRAWING

DESCRIPTION

Figures 1, 3:
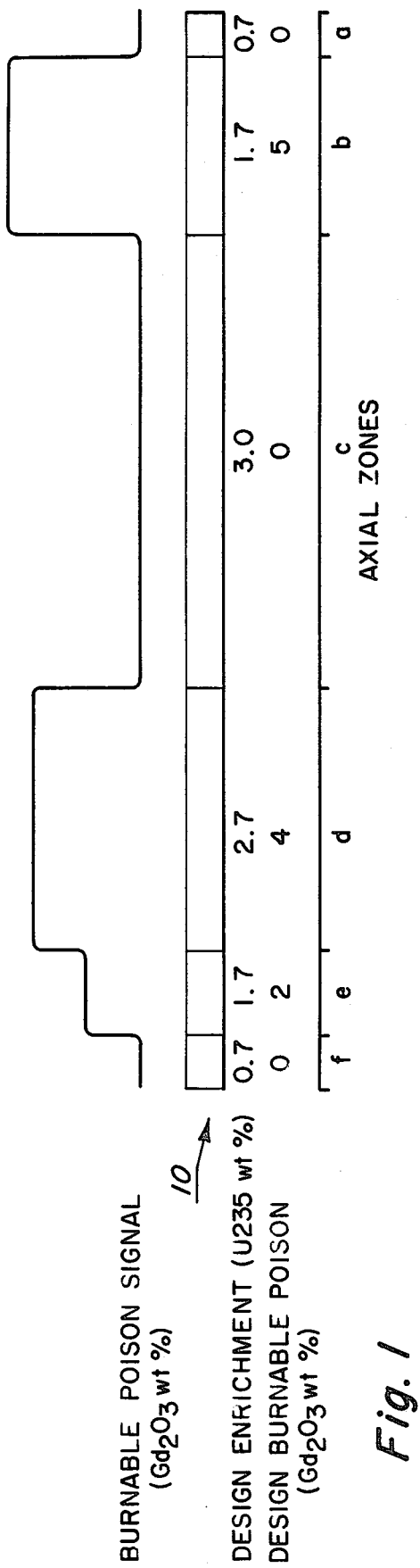
FIG. 1 illustrates an example fuel element having zone-to-zone variations in burnable poison content and fuel enrichment axially along its length.
FIG. 3 is a chart of data obtained in testing an example fuel element in accordance with the invention.

For the purpose of illustrating the problem solved by the present invention there is illustrated in FIG. 1 an example fuel element 10 wherein the fuel enrichment and the amount of burnable poison varies from zone-to-zone along the length of the fuel element. In the illustrated example the changes in enrichment and burnable poison content are coincident, that is, both enrichment and burnable poison content are constant in any given zone. This is a typical arrangement but not a requirement of the invention, that is, the enrichment could be varied within a burnable poison zone or vice versa.

Figure 2:
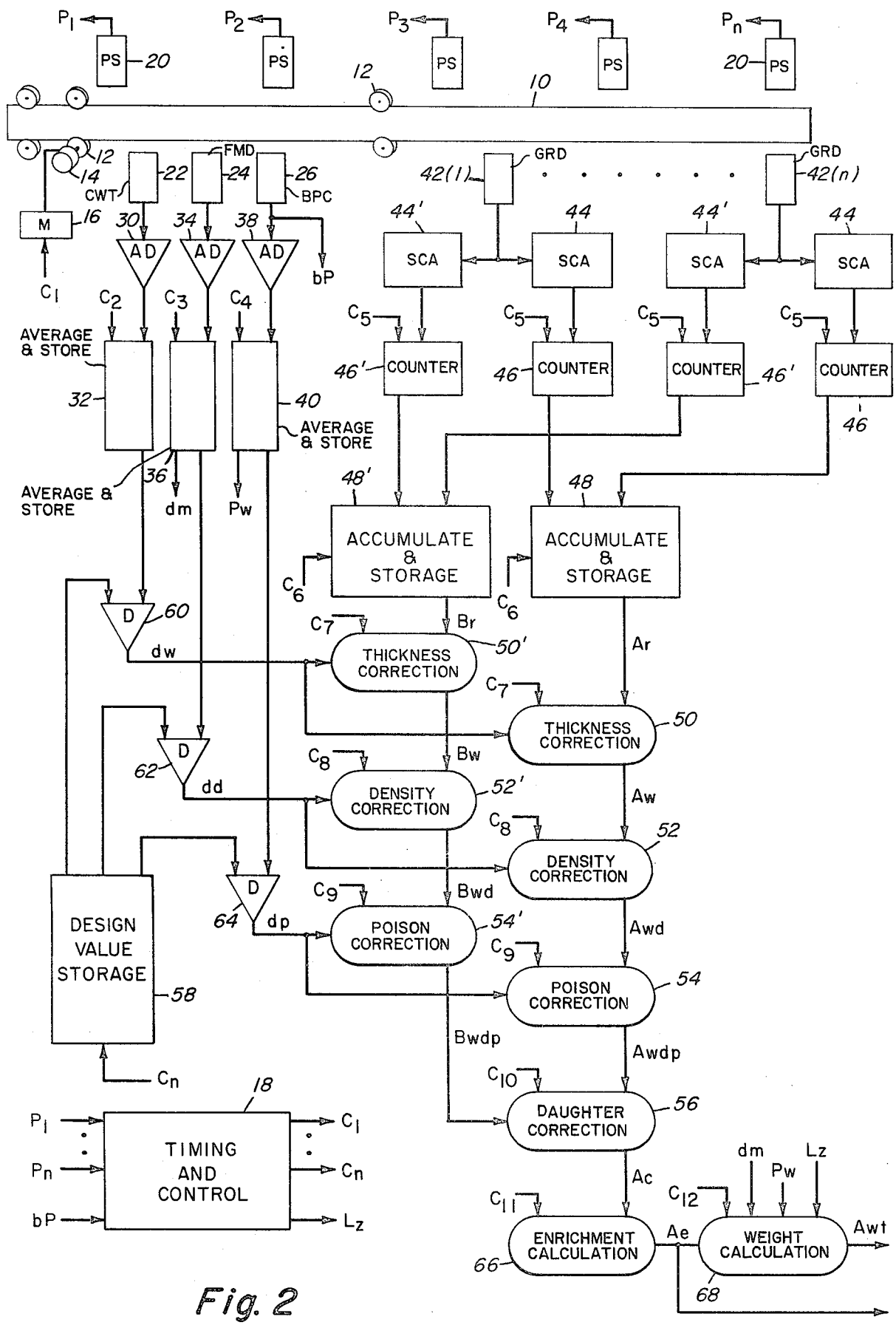
FIG. 2 illustrates in functional diagram form an arrangement for performing the method of the invention.

An example arrangement of apparatus for carrying out the method of the invention is illustrated in functional diagrammatic form in FIG. 2, it being understood that the timing, control, storage and calculational functions illustrated therein normally will be carried out by a suitably programmed data processing device as is well-known in the art.

A fuel element 10 to be scanned typically comprises a column of fuel pellets sealed in a cladding tube formed of a zirconium alloy with an outside diameter of about 12.7 mm and a wall thickness in the order of 0.80 mm. The length of the fuel column is typically in the order of 3.5 m. The fuel element 10 is driven and guided through the scanning station by, for example, a plurality of suitably positioned grooved wheels 12 one or more of which is driven by a stepping motor 14 which is controlled by a suitable driving circuit 16. The driving circuit 16 receives actuation control signals $C_1$ from a master timing and control system 18.

Positioned along the path of the fuel element 10 are a plurality of fuel element position sensors 20 which may be of a known pulsed infrared photoelectric type. (Such devices are available for example from OPCON Inc., Everett, Wash.) Signals $P_1$-$P_n$ from sensors 20 are fed to the timing and control system 18 for control of the frequency of the stepping motor actuation signal $C_1$ and hence the speed of the fuel element through the scanning station.

In one mode of operation a plurality of sequential zones of predetermined length of the fuel material in element 10 are determined and identified from the rod position sensor signals and from the predetermined fuel element speed and a zone identification pattern of signals is established in the timing and control system 18. The lengths of the zones may be selected arbitrarily. For example, each zone may encompass several fuel pellets or may be the length of a fuel pellet whereby the fissile fuel content of each pellet is determined or each zone may be a fraction of the length of a fuel pellet where a higher degree of scrutiny of the fissile fuel content is desired. (An alternate mode of zone determination based upon the distribution of burnable poison in the fuel is described hereinafter.)

Also positioned along the path of the fuel element 10 are the following: a cladding wall thickness sensor 22, a fuel material density sensor 24, a burnable poison content sensor 26 and a plurality of gamma ray detectors 42($l$)-24($n$).

The cladding wall thickness sensor 22 may be of any suitable type, for example, an ultrasonic wave system which determines the wall thickness by detecting the time interval between the wave reflections from the outer and inner surfaces of the claddings. (Such devices are available for example from Sonic Instrument Inc., Trenton, N.J.)

Signals from the wall thickness sensor 22 are preferably digitized (if not already in digital form) by an analog-to-digital converter 30 and stored zone-by-zone for subsequent use in a storage unit 32, the zone identification information being provided from the control system 18 over a connection $C_2$. (Although shown as a single connection, it is to be understood that the connections $C_1$–$C_n$ between the control system 18 and the other elements of the system provide the number of timing, control and information signal paths as required in each case.)

Preferably wall thickness readings are taken from the sensor 22 under control of periodic clock signals from control circuit 18 (for example at distances of 5 mm along the fuel element length) and the storage unit 32 includes means for processing these wall thickness signals to determine the average wall thickness along each zone whereby signals representative of the average wall thickness at each zone are stored for subsequent use.

The fuel material density sensor 24 may be a known gamma ray densitometer arrangement comrising a suitable gamma beam source and a gamma ray detector positioned on opposite sides of the fuel element. The gamma beam is attenuated in its passage through the fuel element in proportion to the fuel material density and, hence, the output signal from the gamma ray detector related monotonically to the fuel material density. (Such a gamma ray densitometer is shown and described in greater detail in copending U.S. Patent Application Ser. No. 932,670 filed Aug. 7, 1978, which is hereby incorporated by reference herein.)

Signals from the density sensor 24 preferably are digitized by an analog-to-digital converter 34 and are stored zone-by-zone for subsequent use in a storage unit 36 the zone identification information being provided from control system 18 over a connection $C_3$.

Preferably the fuel material density readings are taken from the sensor 24 under control of periodic clock signals from control circuit 18 (for example at distances of 5 mm along the fuel element) and the storage unit 36 includes signal averaging means whereby signals representative of the average density of the fuel material in each zone are stored for subsequent use.

The burnable poison content sensor 26 may be of the magnetic type wherein the amounts and distribution of a paramagnetic burnable poison, such as gadolinium, are determined from the changes in paramagnetic susceptibility as the fuel element is passed through a magnetic field. Such systems for determining burnable poison content are described in copending U.S. Patent Applications Ser. No. 754,581, filed Dec. 27, 1976 now U.S. Pat. No. 4,134,064 and Ser. No. 931,670, filed Aug. 5, 1978, the latter being mentioned hereinbefore.

Signals from the burnable poison sensor 26 preferably are digitized by an analog-to-digital converter 38 and the average burnable poison content in each zone is determined and stored for subsequent use by a suitable storeage unit 40.

Gamma ray detectors for detecting the gamma rays emitted from the fuel material due to natural radioactive decay are illustrated in FIG. 2 as sensors $42(l)$–$42(n)$. Preferably the gamma ray sensors $42(l)$–$42(n)$ are of the scintillator type comprised, for example, of slabs of scintillator material such as sodium iodide in the order of 1.3 cm thick and 4 cm outside diameter and formed with a central hole for passage of the fuel element 10 therethrough. The scintillator slabs are coupled to photomultiplier tubes for detection of the scintillations and conversion thereof to electrical pulses. The detectors may be of the solid state type such as lithium drifted germanium or intrinsic germanium. The detectors $42(l)$–$42(n)$ also include the required preamplifiers and pulse shapers. Such detectors and various other aspects of radiation detection and measurement are discussed, for example, by W. J. Price in "Nuclear Radiation Detection", McGraw Hill Book Company, 1964.

The signals from ech of the detectors $42(l)$–$42(n)$ are fed in parallel to a respective pair of single channel analysers 44 and 44' the purpose of which is to separate the pulses from the detectors into two groups, namely, the pulses resulting from gamma rays of energy corresponding to a characteristic energy peak of the fissile material and the pulses resulting from gamma rays of energy greater than such characteristic energy peak.

Thus the analysers 44 and 44' are in essence amplifier circuits having upper and lower input thresholds whereby response of the circuit is limited to the predetermined amplitude range or "window" determined by the threshold settings. Such analysers are well known, are discussed, for example, in U.S. Pat. No. 3,114,835 and are commercially available, for example, from Tennelec Instrument Company, Inc., Oak Ridge, Tenn. as Analyzer Model TC 214.

In accordance with this invention, where the fissile material is U-235 the analysers 44 are adjusted to respond to detector pulses resulting from gamma rays having energy in the range of about 155–220 Kev to thus include the 185 Kev peak characteristic of U-235. The analysers 44' are adjusted to respond to detector pulses resulting from gamma rays having energy in the range of about 245–1190 Kev due to the radioactive daughters of U-238 whereby a U-238 daughter correction count can be developed.

Output pulse signals from analysers 44 and 44' are fed to respective pulse counters 46 and 46' wherein counts of the pulses are accumulated. Under control of clock pulses over connections $C_5$ from control circuit 18, the counts in counters 45 and 46' periodically (e.g., every 300 ms) are fed to respective accumulate and storage units 48 and 48' and the counters 46 and 46' are reset.

The accumulate and storage units 48 and 48' receive zone identification information over connections $C_6$ from control circuit 18 whereby the U-235 counts from counter 46 are received and stored zone-by-zone in unit 48 and the U-238 daughter counts are received and stored zone-by-zone in unit 48'. As the serially arranged multiple detectors $42(l)$–$42(n)$ each scan each of the fuel material zones in succession, the U-235 and U-238 daughter counts from each of the detectors for each of the zones are accumulated in accumulate and storage units 48 and 48'. Thus at completion of the scanning of the fuel element 10, the units 48 and 48' will have accumulated the U-235 and U-238 daughter counts for each of the zones from each of the detectors $42(l)$–$42(n)$.

As mentioned hereinbefore, the use of multiple detectors and the accumulation of the counts therefrom to reduce scanning time is discussed in U.S. Pat. No. 2,717,693.

After completion of the scanning of the fuel element 10 by the detectors $42(l)$–$42(n)$ and accumulation and storage of the U-235 and U-238 daughter counts in units 48 and 48', a series of corrections, namely, correction of the U-235 and U-238 daughter counts for cladding wall thickness, fuel material density and burnable poison content and further correction of the U-235 count by the corrected U-238 daughter count, are performed. These correction functions may be performed by well-known data processing means illustrated in FIG. 2 as function circuits 50, 50', 52, 52', 54, 54' and 56. Connections $C_7$–$C_{10}$ from the timing and control circuit 18 provide suitable control signals to the function circuits.

In the corrections of the U-235 and U-238 daughter counts for wall thickness, density and burnable poison content it is preferred to use values proportional to the deviation of these quantities from their design values, illustrated in FIG. 2 as input signal dw, dd and dp to function circuits 50 and 50', 52 and 52' and 54 and 54', respectively. The deviation signals dw, dd, and dp are provided as follows: Design values of the cladding wall thickness, density of fuel material and burnable poison content of each zone are entered and stored in a storage unit 58. When the stored measured values of wall thickness, density and burnable poison content are called out of storage units 32, 36 and 40, they are fed, along with the corresponding design values from stoage unit 58, to respective comparison circuits such as differential amplifiers, 60, 62 and 64 whereby the deviation signals dw, dd and dp are provided.

The process of correcting the U-235 and U-238 daughter counts is as follows: the U-235 and U-238 daughter counts are called from the storage units zone-by-zone and in parallel, the uncorrected U-235 count being designated a count signal Ar and the uncorrected U-238 daughter count being designated a count signal Br.

The count Ar and the signal dw are applied to the function circuit 50 which provides an output count signal Aw according to the following relationship:

$$Aw = Ar/e^{K_1 dw} \quad (1)$$

where
Aw is the U-235 count corrected for cladding wall thickness,
Ar is the uncorrected U-235 count,
e is the base of the natural system of logarithms,
dw is the deviation of the wall thickness from design value, and
$K_1$ is a wall thickness correction constant.
(It is noted that the constants $K_1$–$K_{11}$ will be defined more specifically hereinafter.)

The count Br and signal dw are applied to the function circuit 50' which provides an output count signal Bw according to the following relationship:

$$Bw = Br/e^{K_4 dw} \quad (2)$$

where
Bw is the U-238 daughter count corrected for cladding wall thickness.
Br is the uncorrected U-238 daughter count, and
$K_4$ is a wall thickness correction constant.

The count Aw and the signal dd are applied to function circuit 52 which provides an output count signal Awd according to the following relationship:

$$Awd = Aw/1 + K_2 dd \quad (3)$$

where
Awd is the U-235 count corrected for cladding wall thickness and fuel material density,
dd is the deviation of fuel material density from design value, and
$K_2$ is a density correction constant.

The count Bw and the signal dd are applied to function circuit 52' which provides an output count signal Bwd according to the following relationship:

$$Bwd = Bw/1 + K_5 dd \quad (4)$$

where
Bwd is the U-238 daughter count corrected for cladding wall thickness and fuel material density, and
$K_5$ is a density correction constant.

The count Awd and the signal dp are applied to function circuit 54 which provides an output count signal Awdp according to the following relationship:

$$Awdp = Awd/1 + K_3 dp \quad (5)$$

where
Awdp is the U-235 count corrected for cladding wall thickness, fuel material density and burnable poison content,
dp is the deviation of burnable poison content from design value, and
$K_3$ is a burnable poison content correction constant.

The count Bwd and the signal dp are applied to function circuit 54' which provides an output count signal Bwdp according to the following relationship:

$$Bwdp = Bwd/1 + K_6 dp \quad (6)$$

where
Bwdp is the U-238 daughter count corrected for cladding wall thickness, fuel material density and burnable poison content, and
$K_6$ is a burnable poison content correction constant.

The counts Awdp and Bwdp are applied to function circuit 56 which provides an output count signal Ac according to the following relationship:

$$Ac = Awdp - K_7 Bwdp \quad (7)$$

where
Ac is the finally corrected U-235 gamma ray count, and
$K_7$ is a U-238 daughter count correction constant.

Two additional function circuits are provided. A function circuit 66 converts the finally corrected U-235 count Ac to a signal Ae indicative of the U-235 enrichment (e.g., weight percent U-235) in each zone while a function circuit 68 determines the weight of U-235 zone-by-zone.

Thus the function circuit 66 receives the corrected U-235 count signal Ac (and zone position and control signals on $C_{11}$) and provides an output signal Ae according to the following relationship:

$$Ae = K_8 Ac + K_9 \quad (8)$$

where
Ae is the average enrichment in the zone in weight percent, and
$K_8$ and $K_9$ are enrichment calibration constants.

The enrichment signal Ae can be taken as a useful output from the system.

The weight of U-235 in each zone is determined from the weight percents of U-235 and burnable poison in the zone and from the density and volume of each zone. In the usual production case the diameter of the fuel pellets is carefully controlled and, therefore, can be taken as constant.

Thus the function circuit 68 receives the U-235 enrichment signal Ae, and signs dm, pw and Lz from storage units 36 and 40 and control circuit 18, respectively, and provides the output signal Awt according to the following relationship:

$$Awt = K_{10} Ae\, dm\, Lz\, (1 - 0.01\, Pw)\, (10.95 - 0.034\, Pw) + K_{11} \quad (9)$$

where:
Awt is the weight of U-235 in the zone,
dm is the measured density of the fuel material in the zone in percent of theoretical density.
Lz is the measured length of the zone,
Pw is the measured weight percent of burnable poison in the zone,
$K_{10}$ is a conversion constant,
$K_{11}$ is a constant which accounts for bias is measurements compared to certified standards,
the term 0.01 is a factor for conversion of weight percent to weight fraction,
the term 10.95 represents the theoretical density of $UO_2$ fuel pellets in gm/cc without burnable poison, and
the term 0.34 represents the change in pellet density due to the addition of one percent burnable poison content.

Where the zone lengths are selected to be uniform the zone length signal Lz is then a constant. However, for some applications it is desirable to employ variable zone lengths such as, for example, in fuel element arrangements such as shown in FIG. 1. In this example the design values of fuel enrichment and the burnable poison content are uniform throughout each burnable poison zone but both fuel enrichment and burnable poison content change from zone-to-zone. In such a case the variable zone lengths of the burnable poison can be determined using the burnable poison sensor 26 and the timing and control circuit 18 and used as the zone lengths Lz in the fissile content determining method of the invention illustrated in FIG. 2. In this event the zone lengths are determined from the changes in the burnable poison signal at the interfaces between zones. That is, the signal bp from the burnable poison sensor 26 is fed to the timing and control circuit 18 and the changes in the level of the signal bp are therein employed (together with the fuel element position signals $P_1$-$P_n$) to develop the zone identification and zone length signals Lz.

The constants $K_1$-$K_{11}$ set forth in the foregoing relationships (1)–(9) are defined more specifically as follows:

$K_1$ represents the exponential dependence coefficient of observed U-235 counts on cladding thickness. $K_1$ may be determined by obtaining long duration U-235 gamma ray counts of aged fuel in two elements of different known cladding thickness, substituting the counts in relationship (1) and solving for $K_1$.

$K_2$ is a U-235 count density correction constant and represents the fractional variation of corrected U-235 counts for a unit percentile change in density. $K_2$ is determined by obtaining the gamma ray count of aged fuel of given burnable poison content but of two different and known densities in elements of given cladding thickness, substituting the counts in relationship (3) and solving for $K_2$.

$K_3$ is a U-235 count burnable poison correction constant which represents the fractional variation of the corrected U-235 counts for a unit percentile change in burnable poison content. $K_3$ is determined by obtaining the gamma ray count of two elements of given cladding thickness containing aged fuel of given density but of different known burnable poison content, substituting the counts in relationship (5) and solving for $K_3$.

$K_4$ represents the exponential dependence coefficient of observed U-238 counts on cladding thickness. $K_4$ is determined by obtaining long duration U-238 gamma ray counts of aged fuel in two elements of different known cladding thickness, substituting the counts in relationship (2) and solving for $K_4$.

$K_5$ is a U-238 count density correction constant and represents the fractional variation of corrected U-238 counts for a unit percentile change in density. $K_5$ is determined by obtaining the gamma ray count of aged fuel of given burnable poison content but of two different and known densities in elements of given cladding thickness, substituting the counts in relationship (4) and solving for $K_5$.

$K_6$ is a U-238 count burnable poison correction constant which represents the fractional variation of the corrected U-238 counts for a unit percentile change in burnable poison content. $K_6$ is determined by obtaining the gamma ray count of two elements of given cladding thickness containing aged fuel of given density but of different known burnable poison content, substituting the counts in relationship (6) and solving for $K_6$.

$K_7$ is the U-238 daughter count correction constant. It represents the fraction of the corrected U-238 counts that must be subtracted from the corrected U-235 counts to obtain the net counts Ac due only to U-235 decay. $K_7$ may be determined by measuring the U-235 and U-238 corrected counts Awdp and Bwdp (from relationships (5) and (6)) for fuel zones of known and same enrichment but of two different ages. (Age refers to the elapsed time since the last chemical processing of the uranium in which the Th and Pu daughter products of U-238 are separated from the material.)

Then:

$$K_7 = \frac{Awdp(2) - Awdp(1)}{Bwdp(2) - Bwdp(1)}$$

$K_8$ and $K_9$ are enrichment calibration constant which are determined by obtaining the gamma ray count of fuel element zones of given same fuel material density, cladding wall thickness and burnable poison content but of different known enrichments. The resulting counts are substituted into relationship (8) with iteratively selected values of $K_8$ and $K_9$ until the difference between the measured average enrichment Ae and the known average enrichment is minimized.

$K_{10}$ is a conversion constant which converts the units of measurement into grams. It is determined by measuring calibration standard elements of known U-235 weight, density, burnable poison content, enrichment and length.

$K_{11}$ is a nuclear materials management constant. It is determined by comparing the measured values of weight of U-235 of standard elements of known values. This comparison is performed over a relatively long time period (e.g., one week) and the purpose of this constant is to minimize any long term bias in the measurement of the U-235 weight.

In an example use of the method of the invention the fuel element was clad with zirconium alloy tubing with an outside diameter of about 1.3 cm and a wall thickness of about 0.8 mm and containing a column of fuel pellets about 3.5 m in length. The fuel was arranged in the fuel element in 7 zones of different length and different enrichment and gadolinium content. The fuel element was driven past the gamma ray detectors at a velocity of 1.5 feet per minute and readings were taken from the pulse counters at a sampling rate of 3 samples/second. The results of a scan of this fuel element are shown in FIG. 3. Accuracy in determination of U-235 content in the fuel element was in the order of plus or minus 0.4 percent (single standard deviation).

While the invention has been described with respect to a particular embodiment of the method and an illustrative arrangement for carrying out the method, variations within the ambit of the invention are possible. For example, correction and processing of the signals from the gamma ray detectors need not await completion of scanning of the fuel element but can begin as soon as the last detector has completed scanning of the first zone.

Since sensing of the cladding wall thickness, fuel material density and burnable poison content can take place at a scanning rate substantially greater (e.g., in the order of two to four times) than the gamma ray scanning rate, it is desirable that the wall thickness sensor 22, the density sensor 24 and the burnable poison content sensor 26 be located at a separate scanning station and multiple gamma scanning stations be provided to thus increase the throughput of the system as a whole.

Since the accuracy of U-235 determination is a function of enrichment and scanning speed, it is contemplated that the gamma scanning speed be varied zone-to-zone in proportion to the enrichments of the zone. This would not only increase throughput but would provide the same accuracy of U-235 determination for each zone.

Means can also be provided to detect deviant pellets within a zone (i.e., pellets of incorrect enrichment) by comparing the U-235 gamma ray counts of successive sampling times and detecting changes of predetermined magnitude.

While the means for carrying out the method of the invention have been illustrated in functional block diagram form in FIG. 2, it is believed obvious that these functions can be achieved in a variety of well-known ways such as by suitably programmed data processing apparatus.

What is claimed is:

1. Method for determining the fissile fuel content of nuclear fuel in a fuel element which may also contain a burnable poison mixed with selected portions of the fuel therein, said fuel element including an elongated cladding tube containing the fuel material, comprising the steps of:
   (1) determining a plurality of sequential zones of said fuel material in said fuel element;
   (2) detecting the gamma ray emission due to the natural radioactive decay of said fuel material in each of said zones in sequence;
   (3) analyzing the gamma ray signals from each of said zones and determining a first gamma ray count of gamma rays within a predetermined range of energies primarily attributable to said fissile fuel and determining a second gamma ray count of gamma rays of energy greater than said predetermined range of energies;
   (4) determining for each zone the thickness of the cladding adjacent the zone;
   (5) correcting said first and second gamma ray counts in accordance with the cladding thickness adjacent each zone;
   (6) determining the density of the fuel material in each zone;
   (7) further correcting said first and second gamma ray counts in accordance with the density of the fuel material in the zone;
   (8) determining the weight percent of burnable poison in each of the zones;
   (9) further correcting said first and second gamma ray counts for each zone in accordance with the weight percent of burnable poison in the zone;
   (10) further correcting said first gamma ray count in accordance with the corrected second gamma ray count; and
   (11) determining from the thus corrected first gamma ray count the weight percent of fissile fuel in each zone.

2. The method of claim 1 further including the step of determining from the weight percent of fissile fuel, the weight percent of burnable poison and the density of fuel material in said zones and from the volumes of the fuel material in the zones the weight of fissile material in each of said zones.

3. The method of claim 1 wherein said zones are determined from the distribution of burnable poison along the length of said fuel element.

4. Method for determining the U-235 content of uranium fuel in a fuel element which also may contain a burnable poison mixed with selected portions of the fuel therein, said fuel element including an elongated cladding tube containing the fuel material, comprising the steps of:
   (1) determining a plurality of sequential zones of said fuel material in said fuel element;
   (2) detecting the gamma ray emission due to the natural radioactive decay of said fuel material in each of said zones in sequence;
   (3) analyzing the gamma ray signals from each of said zones and determining a first gamma ray count of gamma rays within a predetermined range of energies including the characteristic U-235 peak of 185 Kev and determining a second gamma ray count of gamma rays of energy greater than 185 Kev on the continuum of energies due to radioactive daughters of U-238;
   (4) determining for each zone the thickness of cladding adjacent each zone;
   (5) correcting said first and second gamma ray counts in accordance with the cladding thickness adjacent each zone;
   (6) determining the density of the fuel material in each zone;
   (7) further correcting said first and second gamma ray counts in accordance with the density of the fuel material in the zone;
   (8) determining the burnable poison content in each of the zones;
   (9) further correcting said first and second gamma ray counts for each zone in accordance with the content of burnable poison in the zone;

(10) further correcting said first gamma ray count in accordance with the corrected second gamma ray count; and

(11) determining from the thus corrected first gamma ray count the weight percent of U-235 in each zone.

5. The method of claim 4 further including the step of determining from the weight percent of U-235, the content of burnable poison and the density of the fuel material in said zones and from the volumes of said fuel material in the zones the weight of U-235 in each of said zones.

6. The method of claim 4 wherein said zones are determined from the distribution of burnable poison along the length of said fuel element.

7. Method for determining the U-235 content of uranium fuel in a fuel element which also may contain a burnable poison mixed with selected portions of the fuel therein, such fuel element including an elongated cladding tube containing the fuel material comprising the steps of:

(1) determining a plurality of sequential zones of said fuel material along the length of said fuel element;

(2) detecting the gamma ray emission due to the natural radioactive decay of said fuel material in each of said zones in sequence;

(3) analyzing the gamma ray signals from each of said zones and determining a first gamma ray count of gamma rays within a predetermined range of energies including the characteristic U-235 peak of 185 Kev and determining a second gamma ray count of gamma rays of energy greater than 185 Kev on the continum of energies due to radioactive daughters of U-238;

(4) determining for each zone the average deviation of the thickness of the cladding from the design value of the cladding;

(5) correcting said first and second gamma ray counts in accordance with said deviation of the thickness of the cladding from design value in each zone;

(6) determining for each zone the average deviation of the fuel material density from the design density;

(7) further correcting said first and second gamma ray counts in accordance with the said deviation of the fuel material density from design density;

(8) determining the average deviation of the burnable poison content from the design value of the burnable poison content in each of the zones;

(9) further correcting said first and second gamma ray counts for each zone in accordance with said deviation of burnable poison content from design content;

(10) further correcting said first gamma ray count in accordance with the corrected second gamma ray count; and

(11) determining from the thus corrected first gamma ray count the weight percent of U-235 in each zone.

8. The method of claim 7 wherein said first gamma ray count comprises a count of gamma rays of energy in the range of from about 160 to about 205 Kev and said second gamma ray count comprises a count of gamma rays of energy in the range of from about 260 to about 1000 Kev.

9. The method of claim 7 further including the step of determining from the weight percent of U-235, the content of burnable poison and the density of the fuel material in said zones and from the volumes of the fuel material in the zones the weight of U-235 in each of said zones.

10. The method of claim 7 wherein said zones are determined from the distribution of burnable poison along the length of the fuel element.

11. Method for determining the U-235 content of uranium fuel in a fuel element which also may contain gadolinium as a burnable poison mixed with selected portions of the fuel therein, said fuel element including an elongated cladding tube containing the fuel material, comprising the steps of:

(1) determining a plurality of sequential zones of said fuel material along the length of said fuel element;

(2) detecting the gamma ray emission due to the natural radioactive decay of said fuel material in each of said zones in sequence;

(3) analyzing the gamma ray signals from each of said zones and determining a first gamma ray count of gamma rays of energy in the range of from about 155 to about 220 Kev and determining a second gamma ray count of gamma rays of energy in the range of from about 245 to about 1190 Kev;

(4) determining for each zone the thickness of the cladding at the zone;

(5) correcting said first gamma ray count in accordance with:

$$Aw = Ar/e^{K_1 dw}$$

where

Aw is said first count corrected for cladding wall thickness,

Ar is the uncorrected first count, e is the base of the natural system of logarithms, dw is the deviation of the wall thickness from design value, and $K_1$ is a wall thickness correction constant;

(6) correcting said second gamma ray count in accordance with:

$$Bw = Br/e^{K_4 dw}$$

where

Bw is said second count corrected for cladding wall thickness,

Br is the uncorrected second count, and $K_4$ is a wall thickness correction constant;

(7) determining the density of the fuel material in each zone;

(8) further correcting said first gamma ray count in accordance with:

$$Awd = Aw/1 + K_2 dd$$

where

Awd is said first count corrected for cladding wall thickness and fuel material density, dd is the deviation of the fuel material density from design value, and $K_2$ is a density correction constant;

(9) further correcting said second gamma ray count in accordance with:

$$Bwd = Bw/1 + K_5 dd$$

where

Bwd is said second count corrected for cladding wall thickness and fuel material density, and $K_5$ is a density correction constant;

(10) determining the gadolinium content in each of the zones;

(11) further correcting said first gamma ray count in accordance with:

$$Awdp = Awd/1 + K_3 dp$$

where
Awdp is said first count corrected for cladding wall thickness, fuel material density and gadolinium content,
dp is the deviation of gadolinium content from design value, and
$K_3$ is a godolinium content correction constant;

(12) further correcting said second gamma ray count in accordance with:

$$Bwdp = Bwd/1 + K_6 dp$$

where
Bwdp is said second count corrected for cladding wall thickness, fuel material density and gadolinium content, and
$K_6$ is a gadolinium content correction constant; and

(13) further correcting said first gamma ray count in accordance with:

$$Ac = Awdp - K_7 Bwdp$$

where
Ac is the finally corrected first gamma ray count, and
$K_7$ is a correction constant associated with said second gamma ray count.

12. The method of claim 11 further including the step of determining the enrichment of U-235 in each zone in accordance with:

$$Ae = K_8 Ac + K_9$$

where
Ae is the average enrichment in the zone in weight percent, and
$K_8$ and $K_9$ are enrichment calibration constants.

13. The method of claim 12 further including the step of determining the weight of U-235 in each zone in accordance with:

$$Awt = K_{10} Ae\, dm\, Lz\, (1 - 0.01\, Pw)(10.95 - 0.034\, Pw) + K_{11}$$

where
Awt is the weight of U-235 in the zone,
dm is the measured density of the fuel material in the zone in percent of theoretical density,
Lz is the length of the zone,
Pw is the weight percent of gadolinium in the zone,
$K_{10}$ is a conversion constant,
$K_{11}$ is a constant which accounts for bias in measurements compared to known standards.
term 0.01 is a factor for conversion of weight percent to weight fraction,
term 10.95 represents the density of fuel pellets without burnable poison, and
term 0.034 represents the change in pellet density due to one percent burnable poison content.

14. The method of claim 13 wherein the lengths of said zones are determined from the changes in gadolinium content along the length of said fuel element.

* * * * *